United States Patent
Dailey et al.

(10) Patent No.: US 9,698,915 B2
(45) Date of Patent: Jul. 4, 2017

(54) SIGNAL PROCESSOR AND DETECTOR

(71) Applicant: Vencore Labs, Inc., Basking Ridge, NJ (US)

(72) Inventors: James Dailey, Basking, NJ (US); Anjali Agarwal, Basking Ridge, NJ (US); Paul Toliver, Basking Ridge, NJ (US); Colin McKinstrie, Basking Ridge, NJ (US); Nicholas Peters, Knoxville, TN (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 15/166,916

(22) Filed: May 27, 2016

(65) Prior Publication Data

US 2016/0359569 A1    Dec. 8, 2016

Related U.S. Application Data

(60) Provisional application No. 62/170,296, filed on Jun. 3, 2015.

(51) Int. Cl.
 H04B 10/00    (2013.01)
 H04B 10/90    (2013.01)

(52) U.S. Cl.
 CPC .................. H04B 10/90 (2013.01)

(58) Field of Classification Search
 CPC ...... H04B 10/00; H04B 10/90; H04B 10/291; H04B 10/2912; H04J 14/02; H04J 14/0221; H01S 3/06754; H01S 3/06758; H01S 3/094003

USPC ........................................... 398/115, 92, 157

See application file for complete search history.

(56) References Cited

PUBLICATIONS

S. Dhillon, et al, "Terahertz transfer onto a telecom optical carrier," Nature Photonics, vol. 1, p. 411 (2007).
D. M. Baney, et. al., "Coherent optical spectrum analyzer," IEEE PTL 14, (2002).
C. V. Bennett and B. H. Kolner, "Principles of parametric temporal imaging—Part I: System configurations," IEEE JQE 36, (2000).

*Primary Examiner* — M. R. Sedighian
(74) *Attorney, Agent, or Firm* — Heslin Rothenberg Farley & Mesiti P.C.

(57) ABSTRACT

A system and method for processing an input signal includes a non-linear material component for receiving the signal. The non-linear material component is selected to mix the input signal with an optical pump wave to output an optical signal. The system also includes a parametric amplifier coupled to the non-linear material to obtain the optical signal and to amplify the optical signal to generate an amplified signal and an amplified idler which is a conjugate image of the amplified signal. The system also includes a frequency converter, to obtain the amplified signal and the amplified idler from the parametric amplifier and to convert the amplified signal and the amplified idler into a first output and a second output. The system also includes a first spectral sampling and processing apparatus to obtain and process the first output.

20 Claims, 3 Drawing Sheets

400

410

Receiving, by a non-linear material component comprising an electric susceptibility, an input signal, the non-linear material component having a non-linear electric susceptibility.

420

Mixing, by the electric susceptibility of the non-linear material component, the input signal with an optical pump signal to output an optical signal, wherein the optical signal has at least one sideband corresponding to the input signal.

430

Generating, by a parametric amplifier, from the optical signal, an amplified signal and an amplified idler comprising a conjugate image of the amplified signal, where the generating includes obtaining the optical signal and amplifying the optical signal.

440

Obtaining, by a frequency converter, from the parametric amplifier, the amplified signal and the amplified idler.

450

Converting, by the frequency converter, the amplified signal and the amplified idler into a first output and a second output, where the first output includes a first signal quadrature and the second output includes a second signal quadrature.

FIG. 4

SIGNAL PROCESSOR AND DETECTOR

CROSS-REFERENCE TO RELATED APPLICATIONS

This application claims priority to U.S. Provisional Application No. 62/170,296 filed Jun. 3, 2015, entitled, "TERAHERTZ SIGNAL PROCESSOR AND DETECTOR" which is incorporated herein by reference in its entirety.

STATEMENT REGARDING FEDERALLY SPONSORED RESEARCH OR DEVELOPMENT

This invention was made with government support under contract number W31P4Q-13-C-0069 awarded by the U.S. Department of Defense, DARPA Quiness Program. The government has certain rights in the invention.

FIELD OF INVENTION

The Invention relates generally to a system and method for processing and detection of signals, including THz signals.

BACKGROUND OF INVENTION

Terahertz (THz) radiation consists of electro-magnetic waves with frequencies of approximately $10^{11}$-$10^{13}$ Hertz. This part of the electromagnetic (EM) spectrum is currently a rich research topic due to inherent advantages in the fields of communications, imaging, and spectroscopy. However, there are no well-established highly-efficient materials or techniques for the generation, detection, amplification and phase-sensitive processing of THz waves.

Conventional techniques for the manipulation of radio-frequency (RF) signals (i.e. <~100 GHz) in the optical domain cannot be used for THz signals. RF photonics typically uses conventional electro-optic (EO) modulators to upconvert the RF signals onto optical carriers, though these modulators have decreasing performance beyond 40 GHz. Furthermore, there is no clear roadmap for using EO modulators in the high-frequency THz region.

Another challenge when utilizing THz radiation is detection. Although techniques exist for THz detection, they are generally considered to be relatively poor.

SUMMARY OF INVENTION

Shortcomings of the prior art are also overcome and additional advantages are provided through the provision of a system for processing input signals, the system includes: a non-linear material component for receiving the input signal, the non-linear material component having a non-linear electric susceptibility, wherein the non-linear electric susceptibility of the non-linear material component is selected to mix the input signal with an optical pump wave to output an optical signal, wherein the optical signal has at least one sideband corresponding to the input signal; a parametric amplifier coupled to the non-linear material to obtain the optical signal and to amplify the optical signal to generate an amplified signal and an amplified idler comprising a conjugate image of the amplified signal; a frequency converter, coupled to one of: the parametric amplifier or the nonlinear material, to obtain the amplified signal and the amplified idler from the parametric amplifier and to convert the amplified signal and the amplified idler into a first output and a second output, wherein the first output comprises a first signal quadrature and the second output comprises a second signal quadrature; and a first spectral sampling and processing apparatus to obtain and process the first output.

Shortcomings of the prior art are also overcome and additional advantages are provided through the provision of a method for processing a signal, the method includes: receiving, by a non-linear material component comprising an electric susceptibility, an input signal, the non-linear material component having a non-linear electric susceptibility; mixing, by the electric susceptibility of the non-linear material component, the input signal with an optical pump wave to output an optical signal, wherein the optical signal has at least one sideband corresponding to the input signal; generating, by a parametric amplifier, from the optical signal, an amplified signal and an amplified idler comprising a conjugate image of the amplified signal, wherein the generating comprises obtaining the optical signal and amplifying the optical signal; obtaining, by a frequency converter, from the parametric amplifier, the amplified signal and the amplified idler; and converting, by the frequency converter, the amplified signal and the amplified idler into a first output and a second output, wherein the first output comprises a first signal quadrature and the second output comprises a second signal quadrature.

In another aspect of the present invention, the techniques described herein may be utilized for electromagnetic signals of approximately radio frequency (RF) to multi-terahertz (THz). An advantage of certain embodiments of the present invention that the same method that is utilized for processing terahertz signals can be utilized to convert signals with different frequencies.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 4 depicts aspects of a workflow of an embodiment of the present invention.

DETAILED DESCRIPTION OF THE INVENTION

Figure 1:
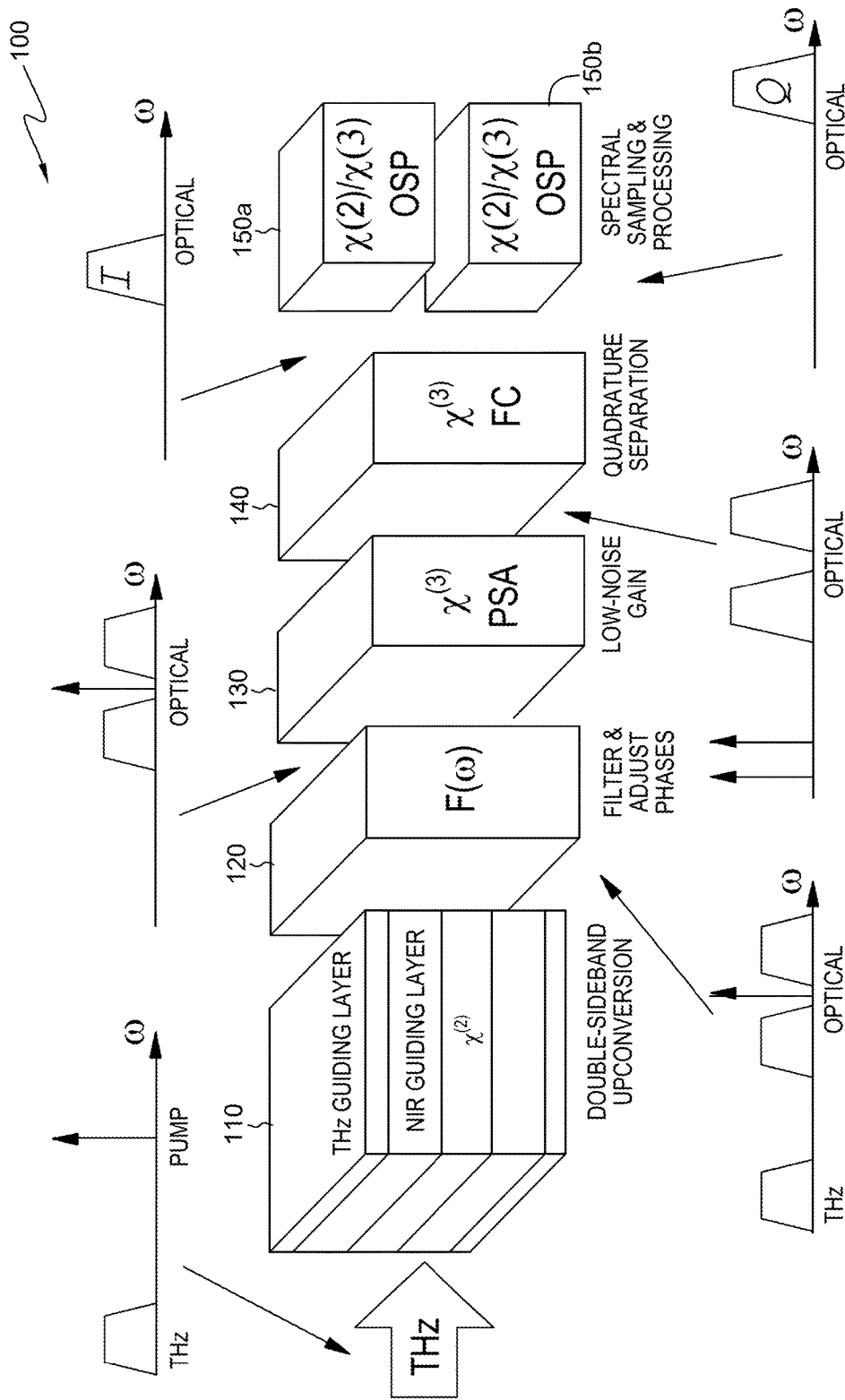
FIG. 1 depicts aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

An embodiment of the present invention is a system for processing and detection of electromagnetic signals, including those signals in a frequency regime of approximately radio frequency (RF) to multi-terahertz (THz). In accordance with aspects of the present invention, optical signals may be downconverted to a THz band, or into multiple, lower GHz and MHz frequency bands, where subsequent electronic processing can be utilized.

An embodiment of the present invention uses dual phase-matched nonlinear processes to create two upconverted copies of an input electromagnetic signal, which can be a terahertz signal. These two copies are phase-conjugates of each other to enable subsequent phase-sensitive amplification. In an embodiment of the present invention, after amplification, these two signals are inputted to an all-optical quadrature separator system which processes the two input spectra such that the two output spectra separately contain the I and Q constituent signals, the signals carrying, respectively, real and imaginary quadratures. In an embodiment of the present invention, a system is wideband in nature and allows further optical signal processing (OSP blocks) or low-loss transmission over fiber to a remote location.

Embodiments of the present invention have many applications and can be utilized to improve various technical fields and integrated into many existing systems and improve those systems. For example, embodiments of the present invention may be utilized in wideband terahertz (THz) radio detection and ranging (RADAR) in degraded visual environments (DVE) because, for example, THz signals can be transmitted more readily when compared to infrared (IR) signals in environments with dust or fog conditions that could impair communication system capabilities. Utilizing THz signals in degraded visual environments presents a number advantages over using IR signals as THz signals enable a higher resolution and a reduced aperture size when compared to IR signals and THz signals can have increased visibility when compared to IR signals in conditions such as dust, fog, and turbulence. Thus, utilizing embodiments of the present invention for THz RADAR under DVE conditions enables the utilization of a system with an integrated, high-resolution multi-THz receiver front-end with wideband I/Q separation for complex RADAR waveform processing.

Another advantage of embodiments of the present application is that they can enables multi-THz coherent signal processing in an integrated optical platform, which allows for substantial size, weight, and power (SWaP) reduction compared to today's banded spectral analyzers. Thus, embodiments of the present invention can provide continuous ultra-wideband spectral analysis coverage from approximately gigahertz (GHz) up to multi-THz. The utilization of embodiments of the present invention across such a broad range of frequencies is advantageous in SWaP-constrained environments as current technologies require, for example, a manned or unmanned vehicle to carry a spectrum analyzer and multiple external mixers to accomplish spectral coverage from 0-1 THz. Thus, advantages of certain embodiments of the present invention are realized particularly with ultra-wideband signals.

Another advantage of certain embodiments of the present invention is that they can be utilized to increase the speed of spectroscopic measurements. Present systems present challenges including large SWaP and slow response times due to swept delay and post-processing. Embodiments of the present invention are an improvement over existing systems because they enable high-speed, multi-THz, frequency-domain spectral analysis with phase-sensitive amplifier (PSA)-enhanced sensitivity and instantaneous I/Q separation in an optically-integrated platform.

Embodiments of the present invention include systems and methods capable of detecting and processing signals, including wideband THz signals. Embodiments of the present invention may be utilized to process signals in the frequency regime of approximately radio frequency (RF) to multi-terahertz (THz).

FIG. 1 is a block diagram representing a system 100 that is an embodiment of the present invention. The embodiment of FIG. 1 leverages phase-sensitive devices to enable low-noise all-optical signal processing when processing electromagnetic signals, including, for example, THz signals. For example, an embodiment of the present invention enables an integrated, high-resolution, multi-THz receiver front-end with wideband I/Q separation for complex RADAR waveform processing. And as aforementioned, an embodiment of the present invention converts an input THz signal to an optical signal and separates the signal quadratures of the optical signal such that the quadratures can be detected individually. One application of this analysis is to spectral imaging of biological molecules for the pharmaceutical industry.

Embodiments of the present invention can be utilized to increase the speed of multi-THz imaging. Applications of multi-THz imaging include, but are not limited to, public safety, including the detection of concealed weapons and package/baggage screening, and medical imaging. Embodiments of the present invention can also be utilized in non-destructive testing, including radome delamination and providing information on coating thickness for airplanes. Challenges of current systems include a large SWaP and slow response time. Embodiments of the present invention offer advantages over existing systems because they can provide high-speed, multi-THz detection with PSA-enhanced sensitivity and instantaneous I/Q separation in an optically-integrated platform.

Embodiments of the present invention can provide advantages over existing signal processing technologies because certain of these embodiments include optical parametric processing enabling ultra-high bandwidth detection of THz signals, with orders of magnitude of more bandwidth than existing processing methods and systems. Additionally, in embodiments of the present invention, the PSA enhances the sensitivity for received signals. Thus, the improvements to technical fields into which embodiments of the present invention are integrated are appreciable.

Referring to FIG. 1, an embodiment of the present invention converts an electromagnetic signal (shown in this example as a THz signal) to an optical signal, which is amplified and separated into quadratures, which are processed separately. To this end, the system 100 of FIG. 1 modulates an optical carrier with a THz input signal and separates the modulated optical signal into quadratures that can be separately detected and/or processed. Although a THz signal is utilized in FIG. 1 as an example, embodiments of the present invention can also convert signals in different parts of the electromagnetic spectrum (different frequencies) into optical signals. THz signals are used as an example because the advantages of embodiments of the present invention are experienced in this range.

Each element of the system 100 will be reviewed in greater detail below, but, in general, in this embodiment of the present invention, a non-linear material component 110 obtains an input signal (e.g., a THz signal) and upconverts the input signal to an optical signal with at least one sideband in the upconversion. In an embodiment of the present invention, the upconverted optical signal comprises double sidebands. A filter 120, which is an optional element in this embodiment of the system 100, obtains the optical signal from the non-linear material component 110 and filters and adjusts the phases. From the filter 120 (and/or from the non-linear material component 110), a parametric amplifier 130, which in this embodiment of the present invention is a phase-sensitive amplifier (PSA) obtains the optical signal and amplifies the optical signal in a noise-free (or low-noise) manner. A type of amplification performed by the PSA is referred to as parametric amplification, which generates an amplified optical signal and an amplified idler that is a conjugate image of the amplified optical signal. A frequency converter obtains the amplified optical signal and the idler from the parametric amplifier 130 and separates the amplified optical signal and idler into quadratures for individual signal processing and/or detection, each by a spectral sampling and processing apparatus 150a-150b.

Referring to FIG. 1, as aforementioned, the system 100 includes a non-linear material component 110 configured to obtain a signal and mix the input signal (e.g., THz signal) with an optical pump wave to produce an optical signal, where the optical signal has sidebands corresponding to the input signal. For example, in an embodiment of the present invention, the non-linear material component 110 can have a non-linear electric susceptibility, where the non-linear electric susceptibility of non-linear material component 110 is selected to mix the input signal with an optical pump wave to produce the output optical signal. In one implementation, the system 100 includes an optical pump capable of generating the optical pump wave.

Figure 2:
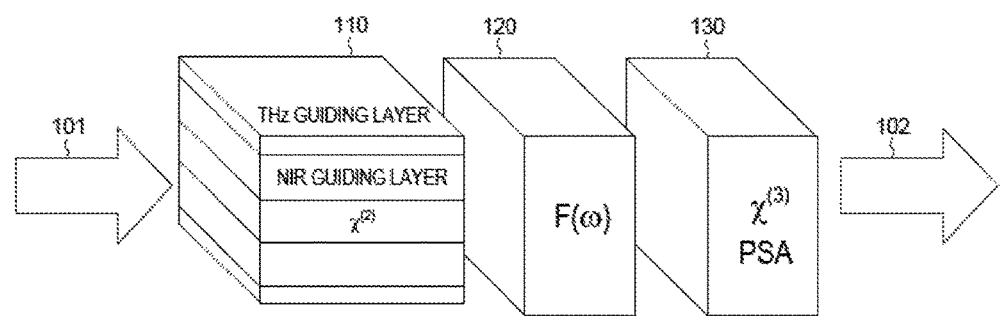
FIG. 2 depicts an aspect of FIG. 1.

FIG. 2 also illustrates the production of the output optical signal by a portion of an embodiment of the present invention. As seen in FIG. 2 (as well in FIG. 1), this embodiment of this aspect of the present invention receives an input signal, in this example, a THz signal, at an input 101 and delivers an optical signal at an output 102. Between the input 101 and the output 102, a non-linear material component 110 mixes the input signal with an optical pump wave to produce the output optical signal and the output optical signal has sidebands corresponding to the input signal.

As seen in this embodiment, a filter 120 can be connected between non-linear material component 110 and output 102. The filter obtains the optical signal from the non-linear material component and can be configured to filter the original input signal and pass the optical signal to output and/or further components of the system 100 for additional processing. In such a case, for example, filter 120 can be configured to modify the relative phases of the output optical signals.

This aspect may also include an optical pump capable of generating the optical pump wave.

Returning to FIG. 1, in an embodiment of the present invention, the non-linear material component 110 is a chi (2)-enabled non-linear material component and functions as a system front-end for system 100 where it receives an optical pump at input (e.g., in the near-infrared (NIR) band) along with an input signal, such as a wide-band THz input signal. In such a case, the resultant optical signal, for example, an optical carrier and dual sideband output, are contained within the NIR band.

In a further embodiment system 100 where the parametric amplifier 130 is a PSA, the parametric amplifier 130 can be configured to amplify the optical signal. In one example, the parametric amplifier 130 can be a chi(3) PSA and can amplify the optical signal in a noise-free manner. Depending on whether the system 100 includes a filter 120, the parametric amplifier 130 may obtain the optical signal from either the filter 120 (if one is included in the embodiment), and/or the non-linear material component 110.

As seen in FIG. 1, an embodiment of the present invention, the parametric amplifier 130 is a phase-sensitive parametric amplifier that obtains the optical signal, which can be understood as a modulated signal. This modulated signal could be a complex signal, for example a wideband arbitrary THz signal, which has been upconverted to optical frequencies and optionally filtered. When the modulated signal (also referred to as the optical signal) is obtained by the parametric amplifier 130. The parametric amplifier utilizes parametric amplification to amplify the modulated signal to generate an amplified optical signal and an amplified idler that is a conjugate image of the amplified optical signal. Thus, the output from the parametric amplifier 130 includes an amplified signal and an amplified idler.

Figure 3:
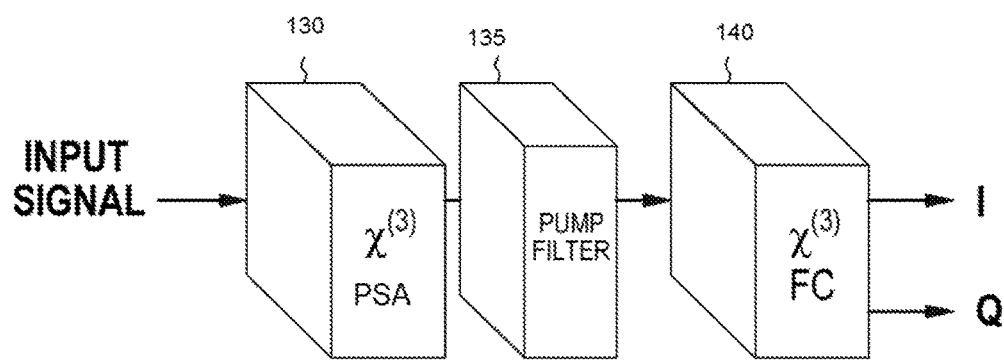
FIG. 3 depicts an aspect of FIG. 1.

Referring also to FIG. 3, an embodiment of the system 100 of FIG. 1 also includes a pump filter 135, which is shown in FIG. 3, which shows the portion of the system of FIG. 1 responsible for quadrature separation. The pump filter 135 obtains the amplified signal and the idler from the parametric amplifier 130. In an embodiment of the present invention, the pump filter 135 filters out the optical pump and supplies the amplified signal and idler to a frequency converter 140. While the parametric amplifier 130 amplifies an input signal and idler (which is a conjugated copy of the signal), a frequency converter 140 transfers power between a signal and an idler.

In an embodiment of the present invention, the frequency converter 140 obtains the amplified optical signal and its conjugate (the idler) and separates the signal quadratures, where the signal is an arbitrary complex signal, as illustrated in FIG. 3. Thus, in an embodiment of the present invention, the frequency converter 140 transfers power between signal and idler and outputs as a first signal quadrature, specifically, at a first output frequency, a real part, and a second signal quadrature, an imaginary part, at a second output frequency. In an embodiment of the present invention, both the parametric amplifier 130 and the frequency converter 140 utilize optical pumps. In a further embodiment, in the parametric amplifier 130, the sum of the pump phases equals the sum of the signal and idler phases, whereas in the frequency convertor 140, the difference between the pump phases equals the difference between the signal and idler phases. In an embodiment of the present invention, an output sideband from the frequency converter 140 (e.g., the signal sideband) carries the real quadrature of the input signal, whereas the second sideband (e.g., the idler sideband) carries the imaginary quadrature.

In the non-limiting embodiment of FIG. 1, the frequency converter 140 is a chi(3) frequency convertor (mixer), operating with a conversion efficiency of 50%. As seen in FIG. 1, the amplified signal has both real and imaginary parts when input into the frequency converter 140, a chi(3) frequency converter (mixer), operating at a fixed conversion efficiency (e.g., 50%).

Upon separation into distinct outputs and output by the frequency converter 140, the separated quadratures can be processed or detected separately. In an embodiment of the present invention that utilizes a PSA as a parametric amplifier 130, large quadrature fluctuations can be reduced by subsequent gain-saturated phase-sensitive amplification.

As explained above, and illustrated in FIG. 1 and FIG. 3, the cascading use of parametric amplification in a phase-sensitive amplifier, such as parametric amplifier 130 in the embodiment of FIG. 1, and frequency conversion in a frequency converter 140 in the system 100 (which is an example of an embodiment of the present invention) enables ultra-wideband separation of signal quadratures for I/Q processing.

Returning to FIG. 1, the system 100 further includes spectral sampling and processing apparatus 150a-150b to detect and process each signal quadrature separately. The use of subsequent frequency conversion (mixing) to achieve quadrature separation enables the further phase-sensitive processing of each quadrature. Although the system 100 of FIG. 1 pictures a spectral sampling and processing apparatus for each quadrature, an embodiment of the present invention may include a single spectral processing apparatus to process one of the resultant signal quadratures.

In an embodiment of the present invention, the same parametric processes (e.g., reversing the elements of the system 100 described) can be used to downconvert optical signals back to the THz band, or into even lower GHz and MHz frequency bands where subsequent electronic processing can be utilized.

Certain embodiments of the present invention provide certain advantages, which were discussed earlier as applied in particular to certain applications. These advantages should not be interpreted as available and/or required in all embodiments of the present invention. An advantage of an embodiment is that it leverages phase-sensitive devices to enable low-noise all-optical coherent signal processing. An advantage of an embodiment of the present invention is that it represents an integrated optical technology enabling wideband access to the spectral region beyond 300 GHz, which is important when scaling wireless data rates beyond 100 Gb/s. An advantage of an embodiment of the present invention is that it enables multi-THz coherent signal processing in an integrated optical platform, which allows for substantial SWaP reduction, when compared to known banded spectral analyzers. An advantage of an embodiment of the present invention is that it provides high-speed, multi-THz, frequency-domain spectral analysis with PSA-enhanced sensitivity and instantaneous I/Q separation in an optically-integrated platform. An advantage of an embodiment of the present invention is that it provides low-noise PSA combined with parametric up/down conversion, which is a potential path to an ultra-wideband (e.g. 10 THz) signal amplifier. An advantage of an embodiment of the present invention is that it includes optical parametric processing that enables ultra-high bandwidth detection of THz signals (e.g., approximately $10^{10}$ more bandwidth). An advantage of an embodiment of the present invention is that it includes PSA, which enhances sensitivity at room temperature (e.g., approximately $10^5$ more sensitivity).

As discussed earlier, the optical signal comprises at least one sideband, but in certain embodiments of the present invention, it includes double sidebands. Returning to FIG. 1, in an embodiment of the present invention, the parametric amplifier 130 may comprise a phase-insensitive amplifier (PIA). In this embodiment, if the parametric amplifier 130 obtains an optical signal with only a single sideband (i.e., the frontend upconversion process only generated a single sideband near the pump that could be inputted to parametric amplifier 130), the parametric amplifier 130, a PIA, may generate an extra amplified idler (at a new NIR frequency) along with the amplified signal. The output of the parametric amplifier 130 could then proceed onto the frequency converter for the quadrature separation. As a PIA is noisier than a PSA, systems utilizing a PIA in place of a PSA may provide both advantages, such as the compensation when only a single sideband is generated, and disadvantages, e.g., more noise. Thus, depending upon the circumstance, embodiments of the present invention with a PIA or a PSA will provide different advantages.

Embodiments of the present invention include method for processing signals. FIG. 4 depicts a workflow of an embodiment of the present invention. As illustrated in FIG. 4, an embodiment of the present invention includes receiving, by a non-linear material component comprising an electric susceptibility, an input signal, the non-linear material component having a non-linear electric susceptibility (410). The method also includes mixing, by the electric susceptibility of the non-linear material component, the input signal with an optical pump wave to output an optical signal, wherein the optical signal has at least one sideband corresponding to the input signal (420). Embodiments of the present invention also include generating, by a parametric amplifier, from the optical signal, an amplified signal and an amplified idler comprising a conjugate image of the amplified signal, wherein the generating comprises obtaining the optical signal and amplifying the optical signal (430) and obtaining, by a frequency converter, from the parametric amplifier, the amplified signal and the amplified idler (440). The method may also include converting, by the frequency converter, the amplified signal and the amplified idler into a first output and a second output, wherein the first output comprises a first signal quadrature and the second output comprises a second signal quadrature (450). In an embodiment of the present invention, the parametric amplifier is a phase-insensitive amplifier and the optical signal includes at least one sideband.

In an embodiment of the present invention, a first spectral sampling and processing apparatus may obtain the first output and process the first output. In another aspect, the method may include obtaining, by a second spectral sampling and processing apparatus, the second output and processing, by the second spectral sampling and processing apparatus, the second output.

In another embodiment of the present invention obtaining the optical signal by the parametric amplifier comprises obtaining the optical signal from the non-linear material component.

In an embodiment of the present invention prior to generating the amplified signal and the amplified idler, a filter may operate on the copy of the input signal. The filtering in this embodiment includes obtaining the input signal, filtering the input signal, and passing the optical output signal to the parametric amplifier. In an embodiment of the present invention, the filtering includes modifying at least one of: relative phases of the optical signal comprising at least one sideband or relative phases of the pump.

In an embodiment of the present invention, generating the amplified signal and the amplified idler includes filtering out, by a pump filter coupled to the parametric amplifier, the optical pump wave and transmitting, by the pump filter, the amplified signal and the amplified idler. Generating the amplified signal and the amplified idler may also include modifying, by a pump filter coupled to the parametric amplifier, a phase of the first sideband and modifying, by the pump filter, a phase of the second sideband relative to at least one of: each other or an optical pump used in the frequency converter.

In an embodiment of the present invention, an optical pump generates the optical pump wave.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for processing a signal comprising:
a non-linear material component for receiving an input signal, the non-linear material component having a non-linear electric susceptibility, wherein the non-linear electric susceptibility of the non-linear material component is selected to mix the input signal with an optical pump wave to output an optical signal, wherein the optical signal has at least one sideband corresponding to the input signal;
a parametric amplifier coupled to the non-linear material component to obtain the optical signal and to amplify the optical signal to generate an amplified signal and an amplified idler comprising a conjugate image of the amplified signal;
a frequency converter, coupled to one of: the parametric amplifier or the nonlinear material, to obtain the amplified signal and the amplified idler from the parametric amplifier and to convert the amplified signal and the amplified idler into a first output and a second output, wherein the first output comprises a first signal quadrature and the second output comprises a second signal quadrature; and
a first spectral sampling and processing apparatus to obtain and process the first output.

2. The system of claim 1, further comprising:
a second spectral sampling and processing apparatus to obtain and process the second output.

3. The system of claim 1, wherein the parametric amplifier comprises a phase-sensitive parametric amplifier.

4. The system of claim 3, further comprising:
a filter, the filter being connected between the non-linear material component and the parametric amplifier, wherein the filter is configured to filter the input signal and pass the output optical signal to the parametric amplifier, wherein the filter is configured to modify at least one of: relative phases of the optical signal comprising at least one sideband or relative phases of the pump.

5. The system of claim 1, further comprising:
a pump filter, the pump filter being connected between the parametric amplifier and the frequency converter, the pump filter being configured to filter out the optical pump and transmit the amplified signal and the amplified idler.

6. The system of claim 3, further comprising:
a pump filter, the pump filter being connected between the parametric amplifier and the frequency converter, the pump filter being configured to modify a phase of the first sideband and to modify a phase of the second sideband relative to at least one of: the first sideband or an optical pump used in the frequency converter.

7. The system of claim 1, wherein the parametric amplifier comprises a phase-insensitive amplifier, wherein the optical signal comprises at least one sideband, the parametric amplifier further to generate an amplified idler, and the frequency converter further to obtain the amplified idler.

8. The system of claim 1, further comprising:
an optical pump capable of generating the optical pump wave.

9. The system of claim 1, wherein the non-linear material component is configured for receiving an input signal in frequency regime of approximately radio frequency to multi-terahertz.

10. A method for processing a signal comprising:
receiving, by a non-linear material component comprising an electric susceptibility, an input signal, the non-linear material component having a non-linear electric susceptibility;
mixing, by the electric susceptibility of the non-linear material component, the input signal with an optical pump wave to output an optical signal, wherein the optical signal has at least one sideband corresponding to the input signal;
generating, by a parametric amplifier, from the optical signal, an amplified signal and an amplified idler comprising a conjugate image of the amplified signal, wherein the generating comprises obtaining the optical signal and amplifying the optical signal;
obtaining, by a frequency converter, from the parametric amplifier, the amplified signal and the amplified idler; and
converting, by the frequency converter, the amplified signal and the amplified idler into a first output and a second output, wherein the first output comprises a first signal quadrature and the second output comprises a second signal quadrature.

11. The method of claim 10, further comprising:
obtaining, by a first spectral sampling and processing apparatus, the first output; and
processing, by the first spectral sampling and processing apparatus, the first output.

12. The system of claim 11, further comprising:
obtaining, by a second spectral sampling and processing apparatus, the second output; and
processing, by the second spectral sampling and processing apparatus, the second output.

13. The method of claim 10, wherein obtaining the optical signal by the parametric amplifier comprises obtaining the optical signal from the non-linear material component.

14. The method of claim 10, further comprising:
prior to generating the amplified signal and the amplified idler, filtering, by a filter, the input signal, the filtering comprising:
obtaining the input signal;
filtering the input signal; and
passing the optical output signal to the parametric amplifier.

15. The method of claim 14, the filtering further comprising modifying at least one of: relative phases of the optical signal comprising at least one sideband or relative phases of the pump.

16. The method of claim 10, the generating the amplified signal and the amplified idler further comprising:
filtering out, by a pump filter coupled to the parametric amplifier, the optical pump wave; and
transmitting, by the pump filter, the amplified signal and the amplified idler.

17. The method of claim 10, the generating the amplified signal and the amplified idler further comprising:
modifying, by a pump filter coupled to the parametric amplifier, a phase of the first sideband; and
modifying, by the pump filter, a phase of the second sideband relative to at least one of: each other or an optical pump used in the frequency converter.

18. The method of claim 10, wherein the parametric amplifier comprises a phase-insensitive amplifier and wherein the optical signal comprises at least one sideband.

19. The method of claim 10, further comprising:
generating, by an optical pump, the optical pump wave.

20. The method of claim 10, wherein the input signal is in frequency regime of approximately radio frequency to multi-terahertz.

* * * * *